UNITED STATES PATENT OFFICE.

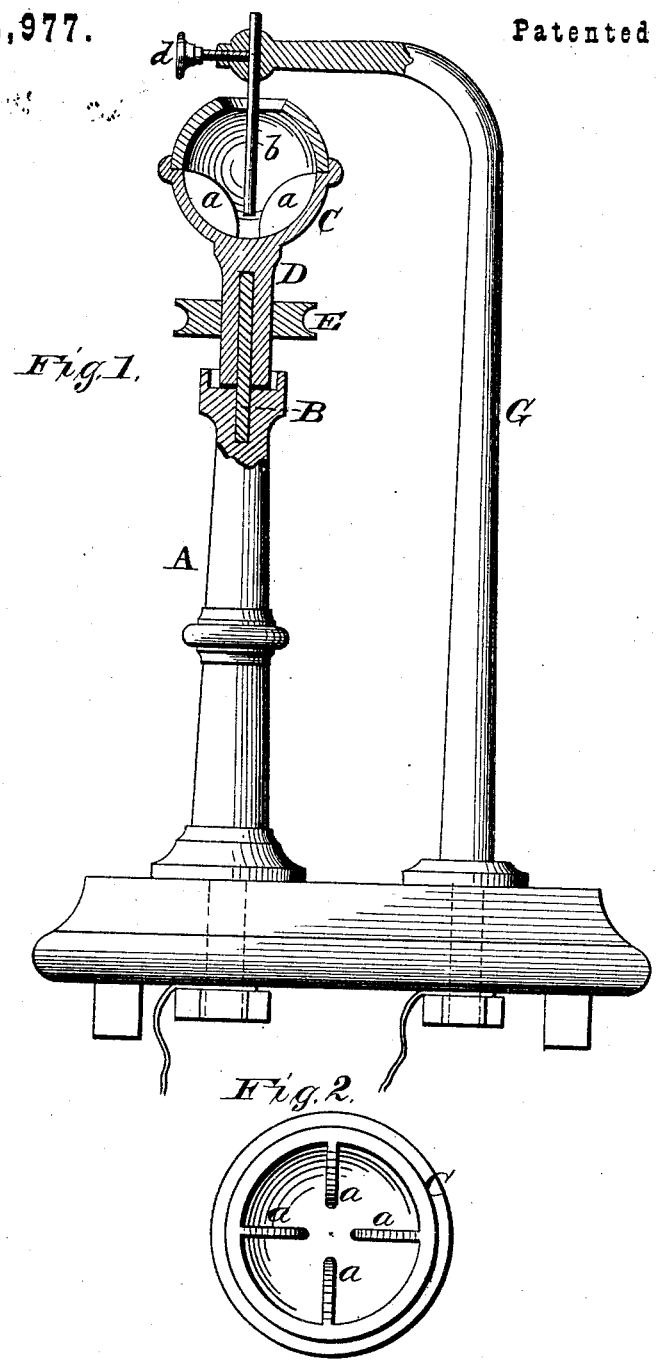

EDWARD WESTON, OF NEWARK, NEW JERSEY.

IMPROVEMENT IN DYNAMO-ELECTRIC MACHINES.

Specification forming part of Letters Patent No. 182,977, dated October 3, 1876; application filed August 14, 1876.

*To all whom it may concern:*

Be it known that I, EDWARD WESTON, of the city of Newark, in the county of Essex, and in the State of New Jersey, have invented certain new and useful Improvements in Dynamo-Electric Machines; and do hereby declare that the following is a full, clear, and exact description thereof, reference being had to the accompanying drawings, and to the letters of reference marked thereon, making a part of this specification.

My invention relates to that class of machines known as "dynamo-electric machines," in which the currents induced in a revolving armature are passed around the electro-magnets, strengthening the magnetic field, this again increasing the strength of the induced currents in the armature, and so on until a maximum is reached.

When such machines are used for any purpose, it is necessary to place the work in circuit with the armatures and electro-magnet, so that the currents induced in the armature may pass through the external circuit and through the coils of the electro-magnets. This gives rise to a very troublesome and serious difficulty when the machine is used for the purpose of electro-deposition.

If the two wires leading from the electrodes immersed in a solution which has been undergoing electrolysis for a short time be placed in connection with a galvanometer, a powerful current will be indicated; but the direction of the current will be the reverse of the original current. This current results from what is commonly known as the "polarization" of the electrodes.

Suppose that a dynamo-electric machine be connected to the electrodes, as above, and the machine is started. The solution will undergo electrolysis, and the electrodes will become polarized. Now, if the machine be stopped, it is evident that the current resulting from the polarization will flow through the armature and electro-magnets, and being in the opposite direction from the original current, it will reverse the polarity of the electro-magnets, and when the machine is again started its current will flow in the opposite direction.

In using such machines for practical plating, I have found that the polarity of the magnets is changed before the machine stops, the reverse current from the vats overcoming the feeble current produced by the machine at the slower speed, and flowing through the coils of the electro-magnets reverses their polarity.

If such a machine be used for the purpose of electroplating or electrotyping, it can easily be seen that if the polarity of the magnets change, by reason of the machine being stopped or run too slow, when the machine is started again the current, being reversed, will dissolve the metal which has previously been deposited upon the articles in the vat, and even the articles would be seriously injured in most cases, spoiling the work, and often the solution also. The object of my invention is to overcome this difficulty in a simple and reliable manner.

The reverse current from the vat is powerful; but it is rapidly exhausted if it be put on short circuit.

If the circuit between the vats and the machine be broken before the machine reaches too slow a speed, the polarity of the magnets will remain unchanged; but it is necessary also that the machine should reach a certain speed before the circuit between the vats and machine be completed. Otherwise the polarity of the magnets will be changed, and the current reversed.

The apparatus which is represented in the drawings, and which I shall now proceed to describe, accomplishes these purposes automatically and certainly, and is capable of being easily adjusted to make and break the circuit at any desired speed.

Figure 1 is a side elevation, part in section, of my apparatus. Fig. 2 is a detached view of a part thereof.

A represents a pillar, of brass, iron, or other conducting material, into which a steel pin, B, is driven. Upon this pin a cup, C, with stem D and pulley E is made to rotate by means of a belt leading from the shaft of the machine, or from any other source of motion. This cup has ribs or paddles *a a* on the inner side of the lower half, as shown in Fig. 2. At a little distance from the pillar A another pillar, G, is placed, standing vertically and parellel with the other; but the upper end of this pillar is bent at or about right angles, so as to project a little way over the center of, and above, the cup C, as shown in Fig. 1.

A hole is drilled near the end of this pillar in a line with the axis of the cup C, and through this is passed a wire, *b*. Another hole is drilled at right angles to this one, and tapped, and a small set-screw, $d$, is inserted, so that, when screwed up, it bears upon the wire $b$, and holds it at any given height.

The pillars A G may be fastened in any suitable manner to a piece of wood or any other insulating material, or fastened in any way to the base of the machine.

The wire $b$ is cleaned and amalgamated with mercury, and a small quantity of mercury is poured into the cup C. The wire $b$ is now adjusted so that it touches the mercury in the cup.

It is evident that, as long as the cup C remains stationary, the mercury will remain at the bottom, and the wire $b$ and cup C will be in metallic connection; but if the cup C be rotated at a certain speed, the mercury will rise in the cup, and the connection between the wire and the cup will be broken.

Supposing now that the two wires $i$ $i$ from the machine are connected with this apparatus, one wire to each pillar, and the machine started, the current will flow up the pillar through the mercury, up the pin $b$ and down the pillar G to the other wire, and back again to the machine, thus completing the circuit; in fact, the circuit would be closed. But suppose the cup C containing the mercury was also caused to rotate by means of a belt running from the shaft of the machine, then it is obvious that, when the machine, and consequently the cup, has reached a certain speed, the connection would be broken, the circuit would be opened, and the current could flow through an outside conductor if it was connected to the two pillars.

Conversely, when the machine, and consequently the cup C, falls to a certain speed, the connection between the cup and pin $b$ would again be completed, and the current would cease to flow into the external conductor, such as an electro-plating vat. It is plain, therefore, that the reverse current could not flow through the coils of the electro-magnets, but would flow through the mercury and would soon be exhausted.

By a slight modification this apparatus may be made to close the circuit between the vats and the machine when the machine reaches a certain speed, and break it again when it falls below that speed. I prefer to do this in the case of large machines, which, when they are on closed circuit with small resistance, require considerable power to start them, and there is great danger of the belt running off before they reach the speed necessary to open the circuit, and break the connection by the mercury rising and leaving the pin $b$. In this case it is necessary to use a wire with a disk of metal slightly smaller than the largest point of the inside of the cup C, so that when the cup revolves, and the mercury rises, it will touch the disk, and when it falls again the connection will be broken. In order to use this arrangement it is necessary to connect one of the wires proceeding from the machine to one of the pillars, and the other pillar is to be connected to a binding-post, to which a wire, leading from one of the electrodes of a vat, may be attached. The other wire from the machine is connected directly to the other electrode in the vat, or, more conveniently, to a binding-post on the base of the machine, to which a wire may be attached at any time. With this arrangement the circuit between the machine and vat is not closed until the machine reaches a certain speed, which can be varied by raising or lowering the disk, and the connection is again broken before the machine falls below a certain speed, thus preventing the reverse currents from the vat passing around the electro-magnets and changing their polarity.

I do not limit myself to this particular device for opening or closing the circuit, as various arrangements based upon the rotation of a mass or masses of metal may be made to answer the same purpose. For instance, the mercury may be dispensed with, and a small governor, similar to those which are used for steam-engines, may be used. The balls expanding and contracting at varying speeds may be made to open or close the circuit in various ways.

By a slight modification this or a similar arrangement may be directly attached to the shaft of the machine, instead of using a belt or other mode of transmitting the power.

Having thus fully described my invention, what I claim as new, and desire to secure by Letters Patent, is—

1. In a dynamo-electric machine, an adjustable switch, operated or controlled by means of a revolving shaft for opening or closing the circuit between the machine itself and an external conductor, the whole being arranged to open the circuit between the machine and the external conductors when the speed of the machine falls to a certain point, as herein set forth.

2. The method of making and breaking the current between a dynamo-electric machine and an external conductor by means of a revolving shaft, a mass of mercury, and an adjustable piece of metal; substantially as herein set forth.

3. In combination with a magneto-electric machine, a switch, operated or controlled by means of a belt or other mode of transmitting power, a revolving shaft, and an adjustable wire or other piece of metal, the whole being arranged to open the circuit between the machine and the external conductor when the speed of the machine falls to a certain point.

In testimony that I claim the foregoing I have hereunto set my hand this 8th day of August, 1876.

EDWARD WESTON.

Witnesses:
H. A. KINGSLEY,
JOHN OTTO.